(12) United States Patent
Katakura et al.

(10) Patent No.: US 7,414,835 B2
(45) Date of Patent: Aug. 19, 2008

(54) DISK ARRAY SYSTEM

(75) Inventors: Yasuyuki Katakura, Odawara (JP); Shigeaki Tanaka, Odawara (JP); Yasuji Morishita, Odawara (JP)

(73) Assignee: Hitachi, Ltd., Tokyo (JP)

( * ) Notice: Subject to any disclaimer, the term of this patent is extended or adjusted under 35 U.S.C. 154(b) by 641 days.

(21) Appl. No.: 11/070,048

(22) Filed: Mar. 1, 2005

(65) Prior Publication Data

US 2006/0126210 A1 Jun. 15, 2006

(30) Foreign Application Priority Data

Dec. 9, 2004 (JP) ............................. 2004-356527

(51) Int. Cl.
*H05K 5/00* (2006.01)
*H05K 7/00* (2006.01)

(52) U.S. Cl. .................. 361/685; 361/684; 361/686; 361/724; 361/730; 361/731

(58) Field of Classification Search ......... 361/683–686, 361/724–732
See application file for complete search history.

(56) References Cited

U.S. PATENT DOCUMENTS

| | | | | |
|---|---|---|---|---|
| 6,108,203 A * | 8/2000 | Dittus et al. | ................. | 361/695 |
| 6,480,379 B1 * | 11/2002 | Dickey et al. | ................. | 361/687 |
| 6,522,539 B2 * | 2/2003 | Ota et al. | ..................... | 361/695 |
| 6,771,497 B2 * | 8/2004 | Chen et al. | ................... | 361/687 |
| 6,927,980 B2 * | 8/2005 | Fukuda et al. | ............. | 361/700 |
| 6,934,158 B1 * | 8/2005 | Teachout et al. | ........... | 361/725 |
| 6,944,702 B1 * | 9/2005 | Chilton et al. | ............. | 710/301 |
| 6,987,674 B2 * | 1/2006 | El-Batal et al. | ............. | 361/788 |
| 7,042,717 B2 * | 5/2006 | El-Batal et al. | ............. | 361/685 |
| 7,128,526 B2 * | 10/2006 | Paulsen | ..................... | 415/146 |
| 7,167,359 B2 * | 1/2007 | Wendel et al. | ............. | 361/685 |
| 7,280,353 B2 * | 10/2007 | Wendel et al. | ............. | 361/685 |
| 7,319,586 B2 * | 1/2008 | Hall et al. | ................... | 361/685 |
| 2004/0036995 A1 | 2/2004 | Suzuki et al. | | |
| 2004/0057205 A1 * | 3/2004 | Chen et al. | ................... | 361/687 |
| 2004/0264133 A1 * | 12/2004 | Fukuda et al. | ............. | 361/695 |
| 2005/0057898 A1 * | 3/2005 | El-Batal et al. | ............. | 361/695 |
| 2005/0094371 A1 * | 5/2005 | Lai | ........................... | 361/687 |
| 2005/0286221 A1 * | 12/2005 | Yamana et al. | ............. | 361/687 |
| 2006/0005555 A1 * | 1/2006 | Alappat et al. | ............... | 62/186 |
| 2006/0039108 A1 * | 2/2006 | Chikusa et al. | ............. | 361/695 |
| 2006/0048001 A1 * | 3/2006 | Honda et al. | ................... | 714/7 |
| 2006/0056964 A9 * | 3/2006 | Tamagawa et al. | .......... | 415/206 |

(Continued)

*Primary Examiner*—Jayprakash N Gandhi
*Assistant Examiner*—Anthony M Haughton
(74) *Attorney, Agent, or Firm*—Townsend and Townsend and Crew LLP

(57) ABSTRACT

A disk array system capable of efficiently cooling the canisters and achieving the high-density mounting of the canisters without reducing the number of canisters is provided. In the disk array system having a HDD box which stores a plurality of canisters, a canister on an upstream side of cooling air and a canister on a downstream side of the cooling air both standing upright are arranged with a difference in level therebetween in the HDD box. The canister on the upstream side has a reliability assurance temperature lower than that on the downstream side, and a disk size of the canister on the upstream side is smaller than that on the downstream side. Also, the canister on the downstream side is arranged higher than that on the upstream side so that an alarm indicator LED and a ready indicator LED can be checked visually.

15 Claims, 15 Drawing Sheets

U.S. PATENT DOCUMENTS

| | | | |
|---|---|---|---|
| 2006/0081366 A1* | 4/2006 | Chiu et al. | 165/296 |
| 2006/0081367 A1* | 4/2006 | Chiu et al. | 165/296 |
| 2006/0087814 A1* | 4/2006 | Brandon et al. | 361/694 |
| 2006/0187634 A1* | 8/2006 | Tanaka et al. | 361/687 |
| 2006/0262657 A1* | 11/2006 | Sueyoshi | 369/1 |
| 2007/0004327 A1* | 1/2007 | Tao et al. | 454/184 |
| 2007/0025076 A1* | 2/2007 | Matsushima et al. | 361/687 |
| 2007/0035875 A1* | 2/2007 | Hall et al. | 360/97.02 |
| 2007/0035879 A1* | 2/2007 | Hall et al. | 360/137 |
| 2007/0035880 A1* | 2/2007 | Hall et al. | 360/137 |
| 2008/0007912 A1* | 1/2008 | Matsushima et al. | 361/695 |

\* cited by examiner

AIR FLOW

FIG.15

FIG.16
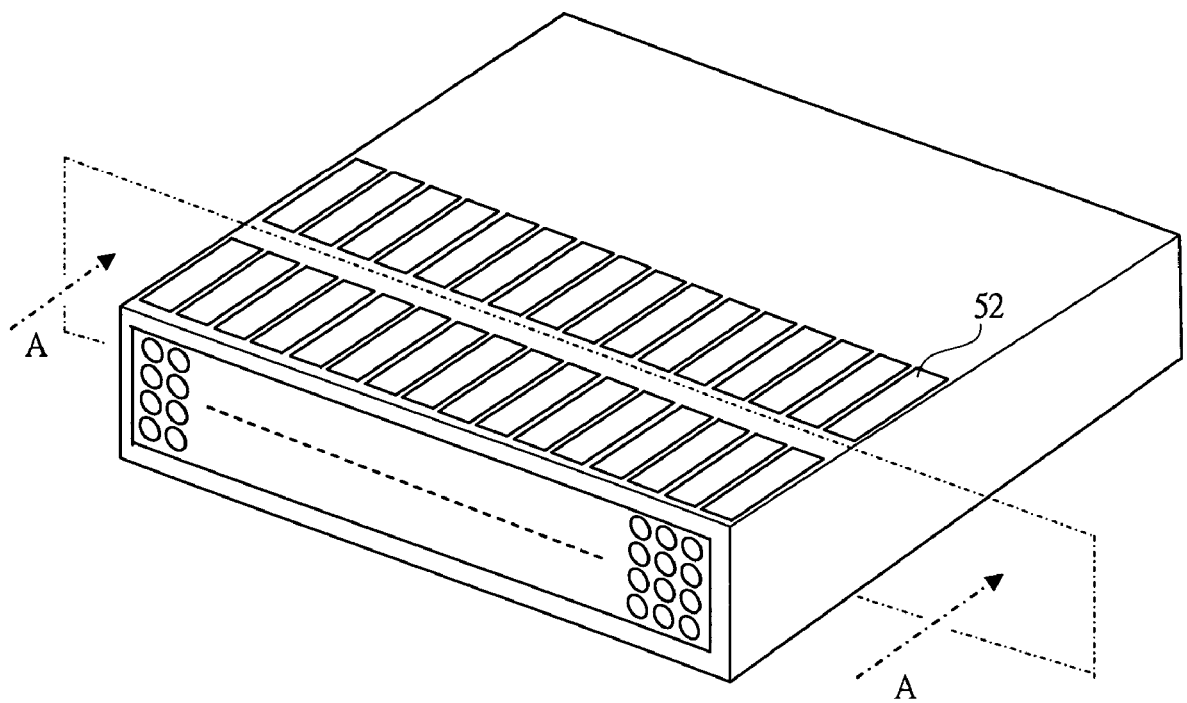
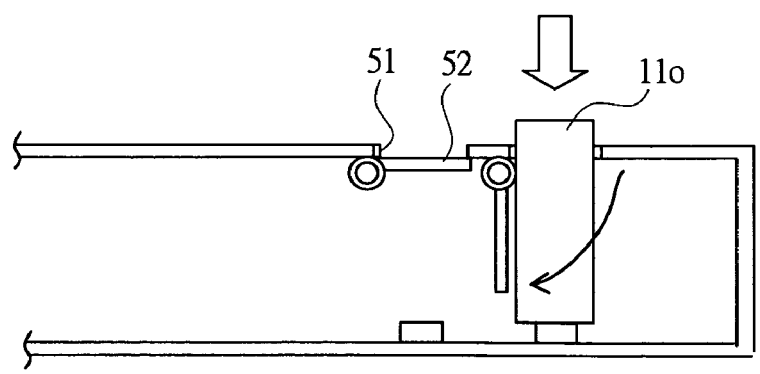
SECTION A-A (CANISTER INSERTION)

SIDE                FRONT

DISK ARRAY SYSTEM

CROSS-REFERENCE TO RELATED APPLICATION

The present application claims priority from Japanese Patent Application JP 2004-356527 filed on Dec. 9, 2004, the content of which is hereby incorporated by reference into this application.

TECHNICAL FIELD OF THE INVENTION

The present invention relates to a mounting technique of a disk array system. More particularly, it relates to a technique effectively applied to a structure of a box which stores a plurality of memory disk units.

BACKGROUND OF THE INVENTION

As a mounting technique of a disk array system, the so-called rack mount type disk array system is known, and in such a rack mount type disk array system, boxes which store the canisters in which a plurality of memory disk units (for example, hard disk drives (HDD)) are assembled into a unit are attached on several stages. The technique concerning the rack mount type disk array system is disclosed in Japanese Patent Laid-Open No. 2004-22058.

SUMMARY OF THE INVENTION

By the way, the density in the disk array system as described above has become higher and the number of canisters to be mounted has been steadily increasing in recent years. In such a situation, the method for effectively cooling the canisters has become more and more important.

Therefore, an object of the present invention is to provide a disk array system capable of realizing the high-density mounting of the canisters and efficiently cooling each of the canisters without reducing the number of canisters to be mounted.

The typical ones of the inventions disclosed in this application will be briefly described as follows.

The present invention is applied to a disk array system, which comprises: a storage device for storing data; and a control unit for controlling read and write of the data from and to the storage device, wherein the storage device has a HDD box in which a plurality of canisters (memory disk units) are stored, and the disk array system has the following characteristics.

(1) In the HDD box, a first canister of the plurality of canisters is arranged while standing upright on an upstream side of cooling air and a second canister of the plurality of canisters is arranged while standing upright on a downstream side of the cooling air, and the first canister and the second canister are arranged so as to have a difference in level therebetween.

(2) The first canister has a reliability assurance temperature lower than or same as that of the second canister, and a disk size of the first canister is smaller than or same as that of the second canister.

(3) The second canister is arranged at a position higher than the first canister so that an indicator of the second canister can be checked visually.

(4) A first wiring board on which the first canister is mounted and a second wiring board on which the second canister is mounted are provided in the HDD box, and the first wiring board and the second wiring board are arranged with a difference in level corresponding to the difference in level between the first canister and the second canister.

(5) The first wiring board and the second wiring board are electrically connected to each other by a flexible wiring board, and voltage is supplied from a power source to the first canister through the first wiring board and voltage is supplied from the power source to the second canister through the second wiring board. In this case, one parity group is comprised of the first canister and the second canister.

(6) The HDD box includes a wiring board on which the first canister and the second canister are mounted, and a first connector used to insert or remove the first canister and a second connector used to insert or remove the second canister are provided on the wiring board and the first and second connectors have height dimensions corresponding to the difference in level between the first canister and the second canister. In this case, inclination between an upper part and a lower part of each of the first connector and the second connector to the wiring board is within a range of 0 to 0.6 mm.

(7) The first canister is comprised of a plurality of canisters which are arranged along a width direction of the HDD box, and the second canister is comprised of a plurality of canisters which are arranged along a width direction of the HDD box. In this case, one parity group is comprised of the plurality of canisters which constitute the first canister and the plurality of canisters which constitute the second canister in the HDD box.

(8) Another HDD box in which a plurality of canisters are stored is provided in addition to the HDD box, and one parity group is comprised of the plurality of canisters in the HDD box and the plurality of canisters in another HDD box.

(9) A plurality of openings through which the plurality of canisters can be inserted or removed are formed in an upper part of the HDD box, and an upper shutter which can be opened and closed is provided on each of the plurality of openings and the upper shutter is opened when the canister is inserted and is closed when the canister is not inserted.

(10) A front shutter which can be moved to cover a plurality of openings for taking the cooling air is provided in a front part of the HDD box, and the front shutter is moved to uncover openings corresponding to positions of the inserted canisters and cover openings corresponding to positions where the canisters are not inserted.

(11) A plurality of rollers for applying load when the plurality of canisters are inserted or removed are provided in the HDD box, and the load is applied by the rollers when inserting or removing the canister.

The effect obtained by the representative one of the inventions disclosed in this application will be briefly described as follows.

According to the present invention, it is possible to realize the high-density mounting of the canisters and the efficient cooling of the canisters without reducing the number of the canisters to be mounted.

BRIEF DESCRIPTIONS OF THE DRAWINGS

FIG. 15 is a diagram showing a positional relationship of inserted canister according to an embodiment of the present invention;

FIG. 16 is a diagram showing the electromagnetic shield structure by an upper shutter according to an embodiment of the present invention;

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

(Overall Structure of Disk Array System)

Figure 1:
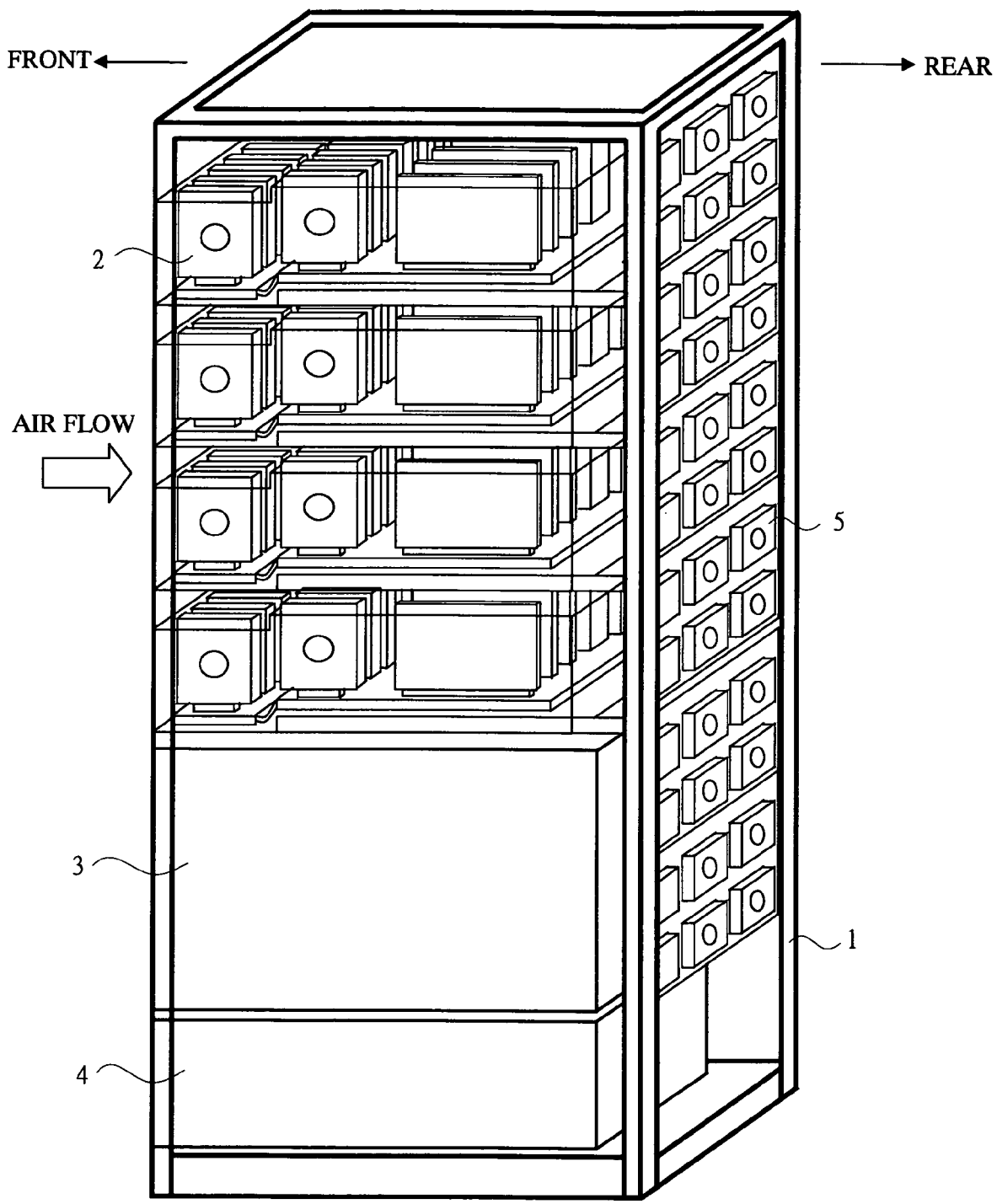
FIG. 1 is a diagram showing an overall structure of a disk array system according to an embodiment of the present invention.

An example of the overall structure of the disk array system according to an embodiment of the present invention will be described with reference to FIG. 1. FIG. 1 shows an overall structure of a disk array system according to this embodiment. In FIG. 1, the front door and the rear and side panels of the chassis are removed so as to make the inside of the chassis easy to see, and the outer frame of the HDD box is depicted by solid lines so as to make the inner structure easy to see.

For example, the disk array system according to the present invention employs the rack mount type as shown in FIG. 1, in which various functional boxes which constitute the disk array system are stored in a chassis frame 1. The functional boxes include HDD boxes 2 in which a plurality of canisters are stored, a logical control box 3 in which a logical board and a control unit are stored, and a power source box 4 in which the AD power source is stored.

In this chassis frame 1, a plurality of HDD boxes 2 (four stages in the example of FIG. 1), the logical control box 3, and the power source box 4 are stored in this order from above. Also, cooling fans 5 are provided on the rear face of the chassis frame 1, and the cooling air flows from the front side to the rear side of the chassis frame 1.

A plurality of canisters are stored in the HDD box 2. In this case, the HDD unit in which the HDD for storing data, the circuit board, and the connector are assembled into a unit is called canister. In addition to a plurality of canisters, a fiber switch for connecting the canister and the control unit, an AC/DC power source for converting the alternating current to the direct current, a battery for the backup in the case of blackout and the like are stored in the HDD box 2.

The logical board and the control unit are stored in the logical control box 3. More concretely, the logical control box 3 is provided with a disk adaptor for controlling the data read and the data write from/to the HDD, a channel adaptor for receiving data input/output request from outside, a shared memory in which control information transmitted by the channel adaptor and the disk adaptor is stored, a cache memory in which data transmitted between the channel adaptor and the disk adaptor is temporarily stored, a controller responsible for the overall control, and a service processor which manages the disk array system.

The power source box 4 is an AC power source for supplying AC voltage supplied from outside to the HDD box 2 and the logical control box 3 in the disk array system.

(Mixed Mounting of Different Types of Canisters)

Figure 2:
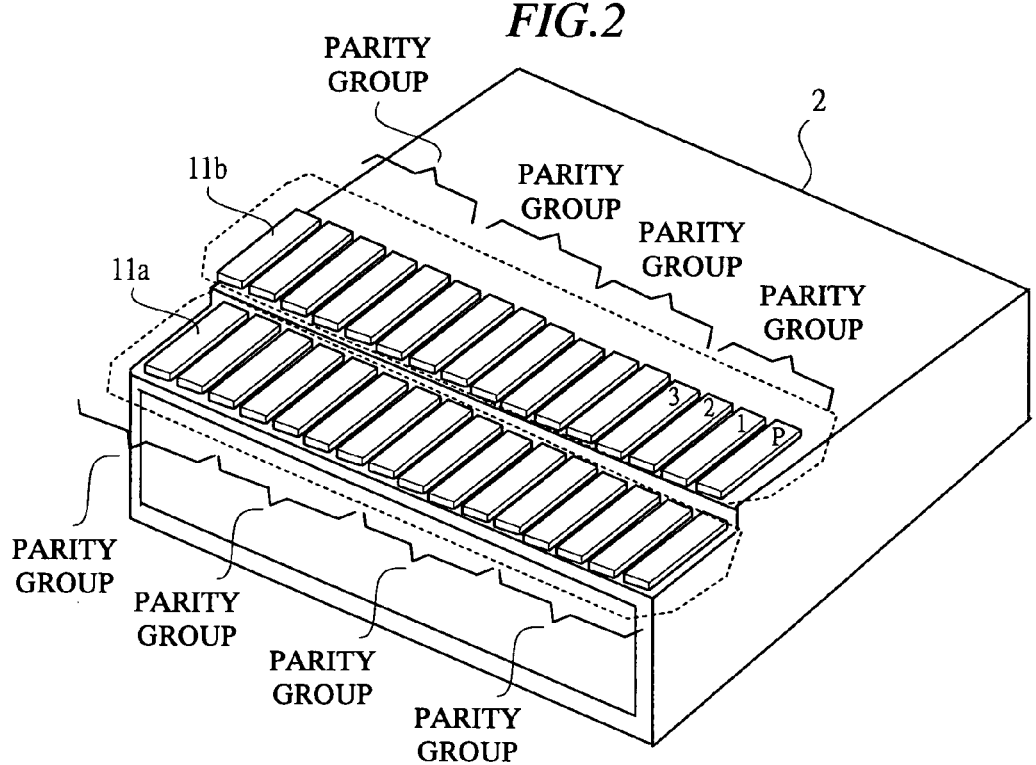
FIG. 2 is a diagram showing the layout of the canisters focused on the reliability assurance temperature according to an embodiment of the present invention.
Figure 3:
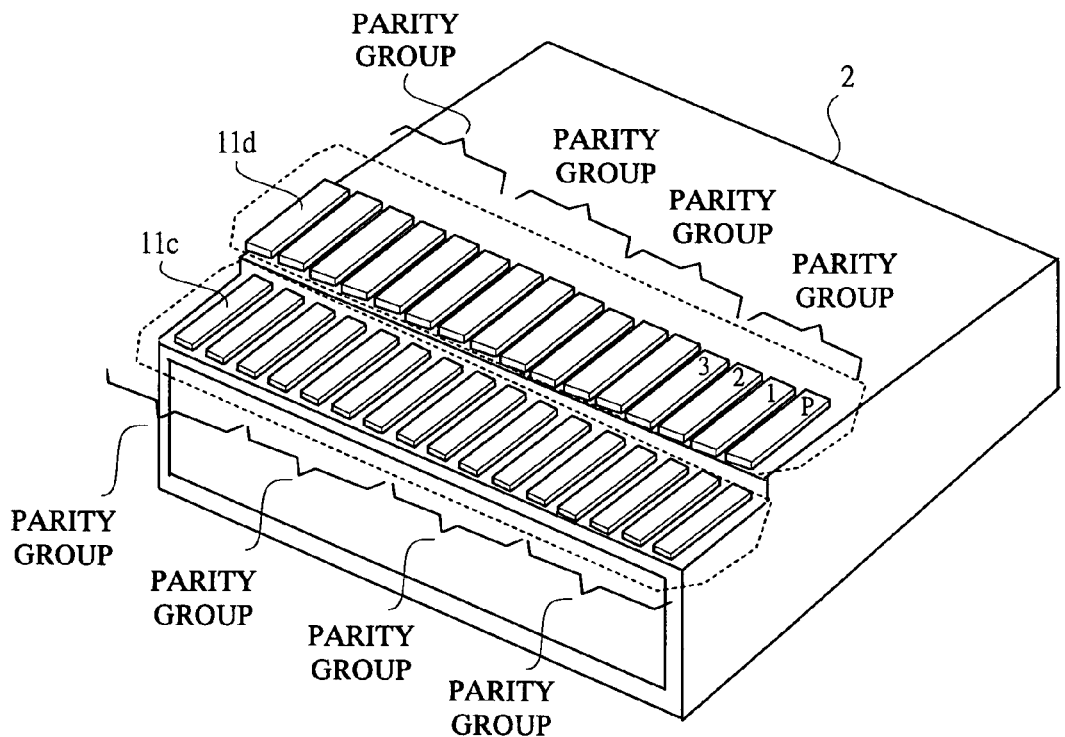
FIG. 3 is a diagram showing the layout of the canisters focused on the disk size according to an embodiment of the present invention.

An example of the mixed mounting of different types of canisters in the HDD box will be described with reference to FIGS. 2 and 3. FIG. 2 shows the layout of the canisters focused on the reliability assurance temperature, and FIG. 3 shows the layout of the canisters focused on the disk size, respectively.

Usually, the mixed mounting of different types of canisters can be achieved based on the parity group in the disk array system. This parity group indicates a HDD group, and one parity group consists of, for example, 3D (data disk)+1P (parity disk) or 7D+1P. The parity disk has a function to control and support each of the data disks.

In one case, for example, the canister with a disk rotation speed of 7.2 kmin$^{-1}$, that with a disk rotation speed of 10 kmin$^{-1}$, and that with a disk rotation speed of 15 kmin$^{-1}$ are mixedly mounted. These canisters differ in heat generation due to the difference of the rotation speed, and as a result, the reliability assurance temperature also differs.

Therefore, the disk array system according to this embodiment focuses on the reliability assurance temperature. More specifically, in order to minimize the influence by the heating elements located on the upstream side of the cooling air, a step (or difference in level) is made between the upstream side and the downstream side, and canisters 11a with a low reliability assurance temperature are arranged while standing upright on the upstream side and canisters 11b with a high reliability assurance temperature are arranged while standing upright on the downstream side as shown in FIG. 2. In this manner, by the mixed mounting of the different types of canisters from the viewpoint of the reliability assurance temperature, the disk array system with higher reliability can be obtained. In this mixed mounting, the locations of the canisters to be mounted can be modified depending on the difference in heat generation.

Further, since the mixed mounting of the different types of canisters is possible in the disk array system, the mixed mounting of the canisters with different disk size is also possible. For example, the canisters with the disk size of 3.5 inch and those with the disk size of 2.5 inch need to be mounted in the disk array system in some cases.

Therefore, when the canisters with the disk size of 3.5 inch and those with the disk size of 2.5 inch are mounted in the disk array system according to this embodiment, in order to reduce the conduit resistance of the canisters arranged on the upstream side, the canisters 11c with the disk size of 2.5 inch are arranged while standing upright on the upstream side and the canisters 11d with the disk size of 3.5 inch are arranged while standing upright on the downstream side in consideration of the flow path of the heated air and the heat generation as shown in FIG. 3. In this manner, by the mixed mounting of the different types of canisters from the viewpoint of the disk size, the disk array system with higher reliability can be obtained.

(Insertion and Removal of Canister)

Figure 4:
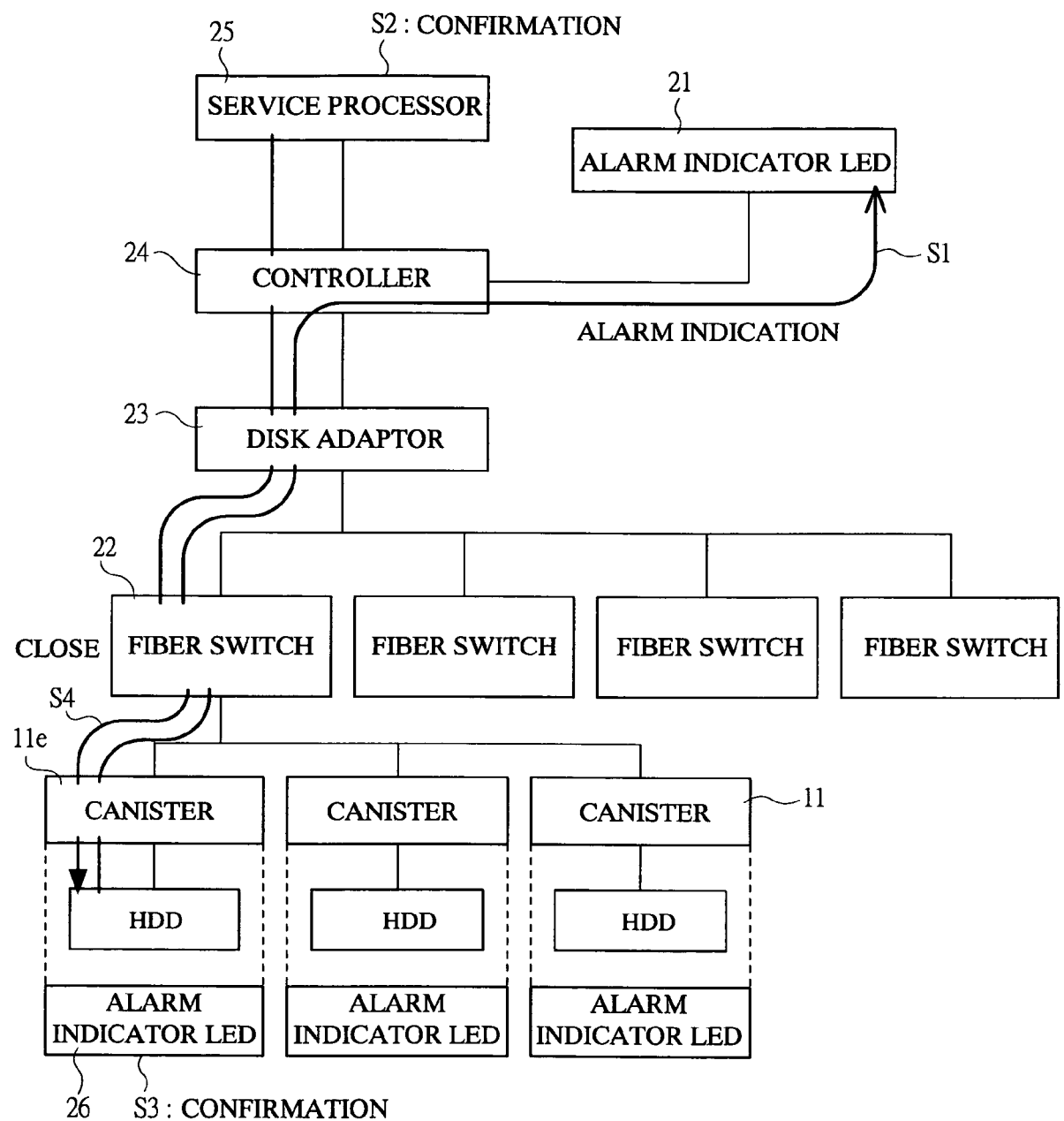
FIG. 4 is a diagram showing the removal of a defective canister according to an embodiment of the present invention.

An example of the insertion and removal of the canister will be described with reference to FIG. 4. FIG. 4 shows the removal of the defective canister.

In the disk array system, the indicator function is usually provided in the canister and the door of the chassis so as to visually check the operation of the canisters from outside. This indicator function is also important, and the disk array system according to this embodiment achieves both of the indicator function and the high-density mounting. In this indicator function of the disk array system, after confirming the presence of the canister to be closed on the service processor, the canister to be closed is determined by the indicator provided in the canister or the indicator showing the location of the canister provided in the door of the chassis. Then, the defective canister is replaced.

In addition, since the reliability can be further improved if the defect is shown in the defective canister itself, the indicator on the defective canister itself has priority. If this function is not provided, the canister normally operated may be stopped or removed by mistake in some cases. As a result, serious troubles such as system down and the like may occur. Therefore, this indicator function is indispensable for the disk array system.

For example, in the case where a trouble occurs in a canister 11e as shown in FIG. 4, the alarm indication for notifying the occurrence of the defect by an alarm indicator LED 21 of the indicator provided on the door of the chassis is used (S1). The signal of this alarm indication is transmitted from the defective canister 11e to the alarm indicator LED 21 through the fiber switch 22, the disk adaptor 23, and the controller 24, and the alarm indicator LED 21 lights up.

An operator who notices the alarm indication first confirms the presence of the defective canister 11e on the service processor 25 (S2). Then, after verifying the address of the canister 11e, the operator checks the alarm indication of the alarm indicator LED 26 provided in the canister 11e itself (S3).

Thereafter, the operator uses the service processor 25 to issue the replace command to close the defective canister 11e (S4). This command signal to close the canister is transmitted from the service processor 25 to the canister 11e through the controller 24, the disk adaptor 23, and the fiber switch 22, and the canister 11e is closed. Then, when the closed canister 11e comes in a removable state, the canister 11e is removed.

Thereafter, the operator inserts a normally operating canister instead of the removed canister. By doing so, the disk array system can be recovered to a normal operation state. The removal and insertion of the canister can be executed without powering down the system.

(Power Source of Canister and Parity Group)

Figure 5:
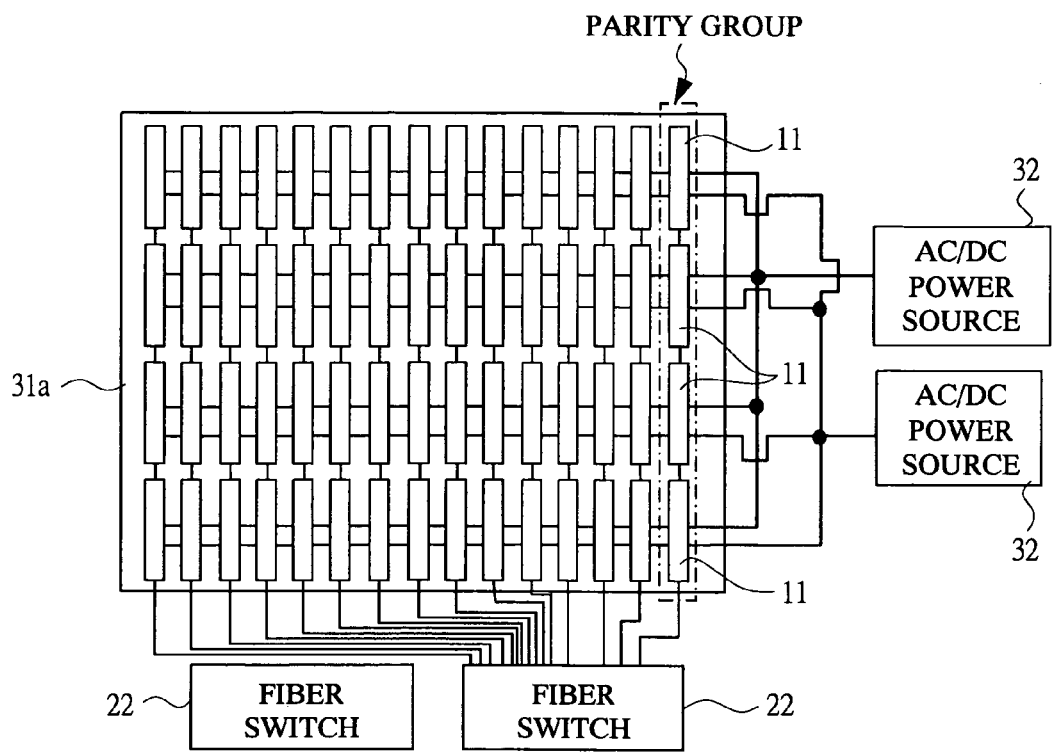
FIG. 5 is a diagram showing the parity group and the power source in the case where one wiring board is used, as a comparison example (usual case) according to an embodiment of the present invention.

An example of the power source of the canister and the parity group will be described with reference to FIGS. 5 to 7. FIG. 5 shows the parity group and the power source in the case where one wiring board is used, FIG. 6 shows those in the case where two wiring boards are used, and FIG. 7 shows those in the case where four wiring boards are used, respectively.

For example, the usual disk array system has the configuration of the power sources and the parity groups of the wiring board which mounts the canisters in the HDD box as shown in FIG. 5. More specifically, a plurality of canisters 11, that is, total of 60 canisters (4×15) are arranged in matrix form on the wiring board 31a, and the voltage is supplied laterally from the AC/DC power sources 32 to each of the canisters 11 in FIG. 5. Also, one parity group is composed of each four canisters 11 arranged longitudinally and connected to the fiber switch 22.

Figure 6:
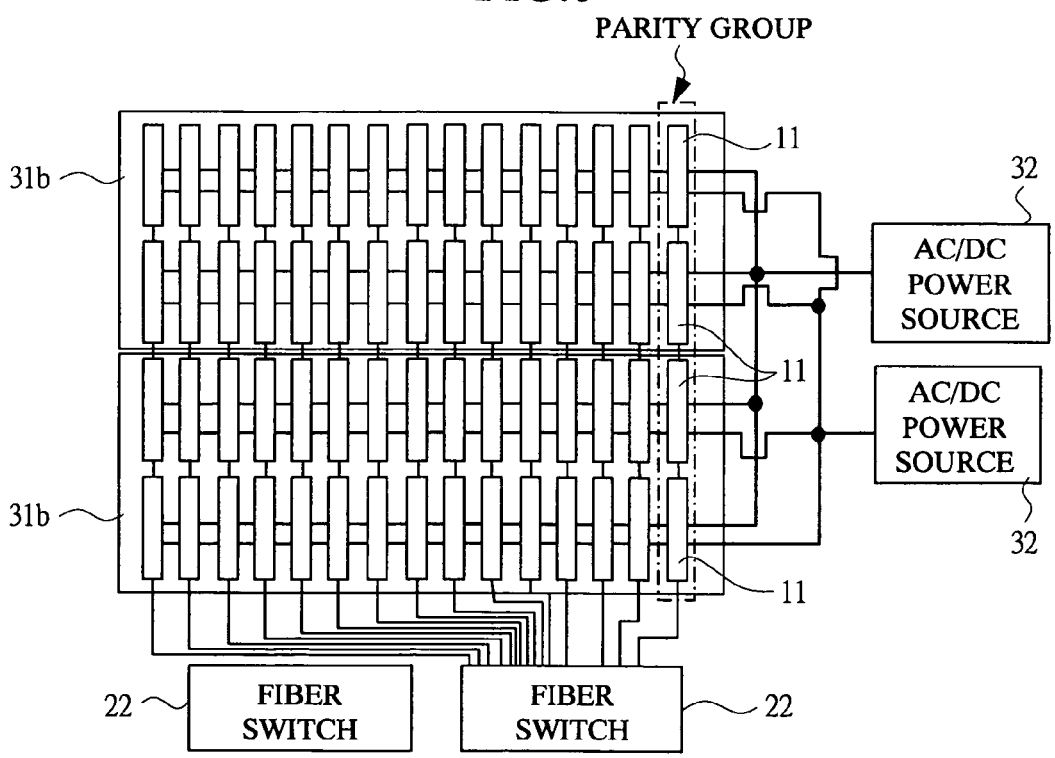
FIG. 6 is a diagram showing the parity group and the power source in the case where two wiring boards are used according to an embodiment of the present invention.

However, the disk array system according to this embodiment has the configuration as shown in FIG. 6, in which 30 canisters 11 (2×15) are arranged on each the two wiring boards 31b, and the power sources and the parity groups are provided. The voltage is supplied laterally from the AC/DC power sources 32 to each of the canisters 11 on the wiring boards 31b. Also, one parity group is composed of each four canisters 11 arranged longitudinally across the two wiring boards 32 and connected to the fiber switch 22.

Figure 7:
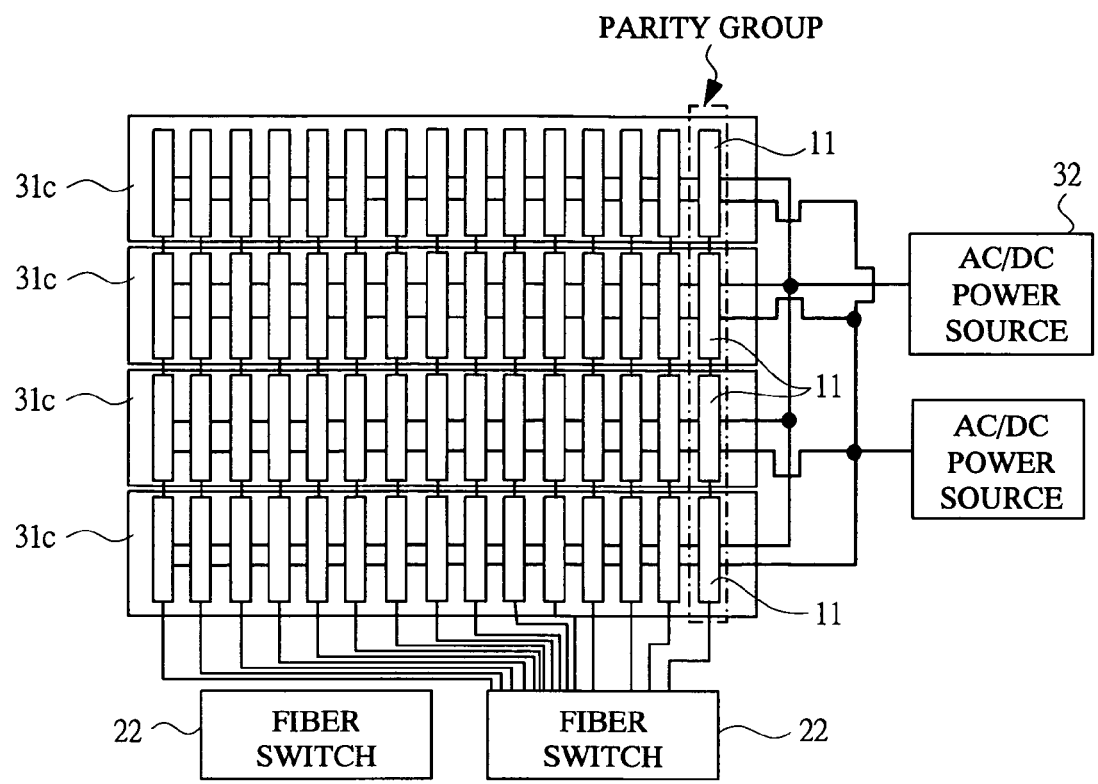
FIG. 7 is a diagram showing the parity group and the power source in the case where four wiring boards are used according to an embodiment of the present invention.

Also, another example of the disk array system according to this embodiment has the configuration as shown in FIG. 7, in which 15 canisters 11 (1×15) are arranged on each the four wiring boards 31c, and the voltage is supplied laterally from the AC/DC power sources 32 to each of the canisters 11 of each wiring board 31c. Also, similar to the example shown in FIG. 6, one parity group is composed of each four canisters 11 arranged longitudinally across the four wiring boards 31c.

(Mounting of Canister)

Figure 8:
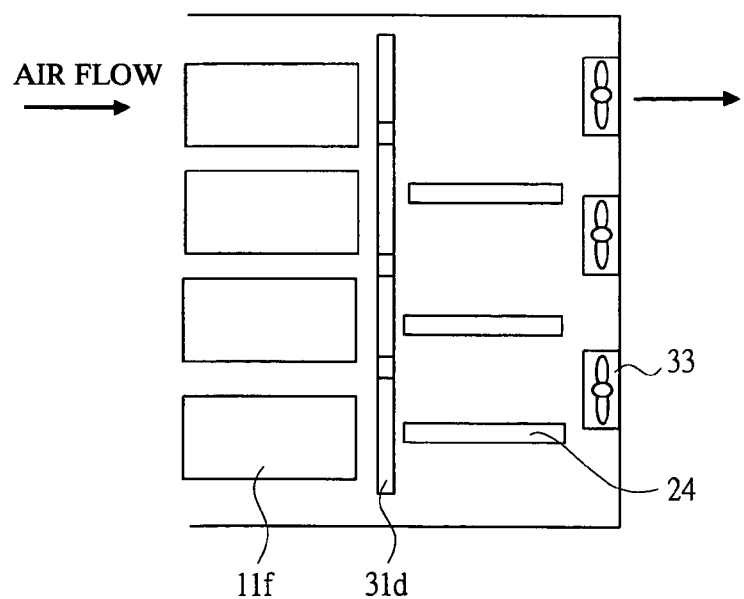
FIG. 8 is a diagram showing the case of the vertical plane mounting as a comparison example (usual case) according to an embodiment of the present invention.
Figure 9:
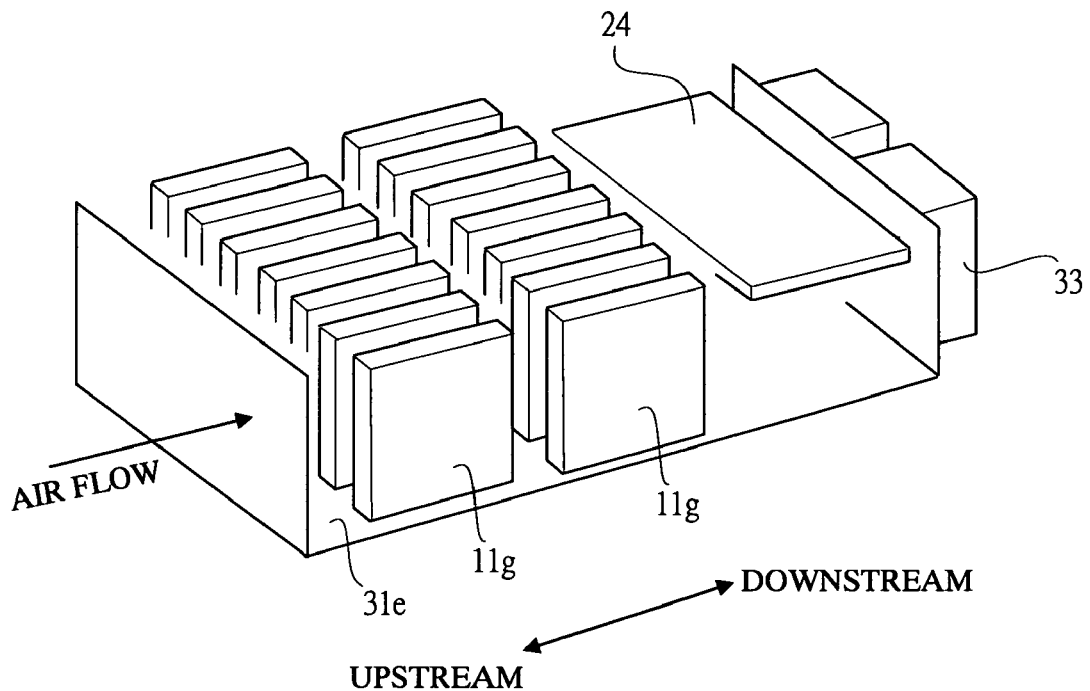
FIG. 9 is a diagram showing the case of the horizontal plane mounting as a comparison example (usual case) according to an embodiment of the present invention.
Figure 10:
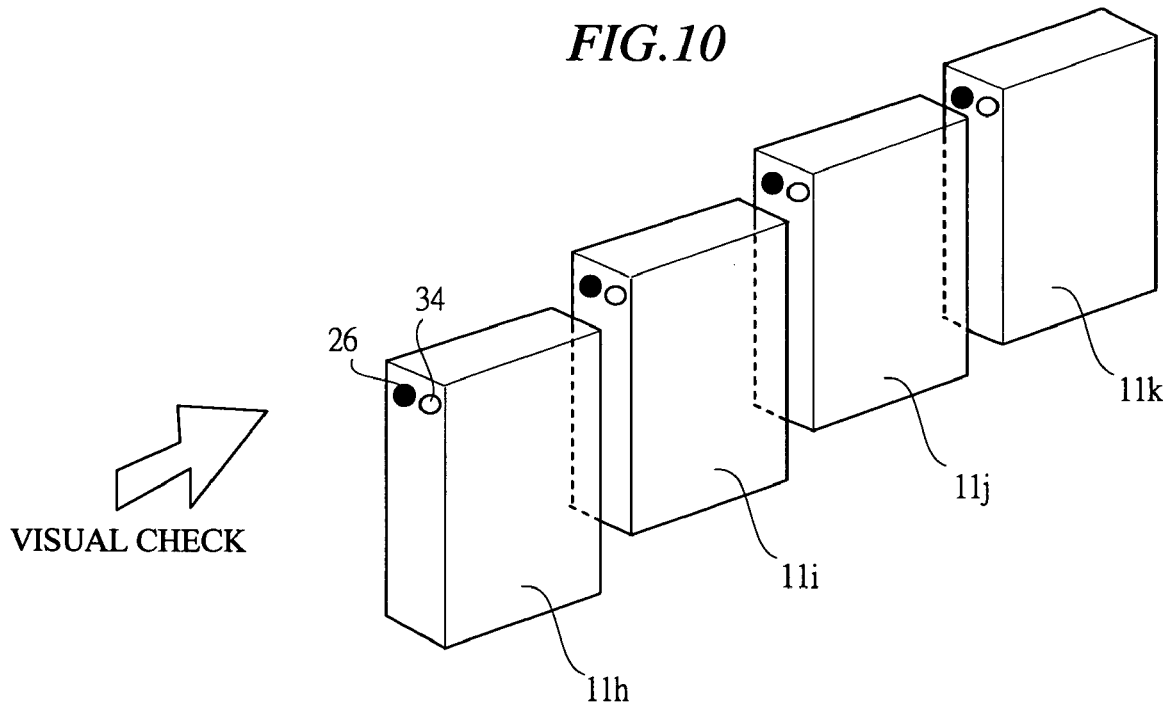
FIG. 10 is a diagram showing the case of a three-dimensional mounting according to an embodiment of the present invention.
Figure 11:
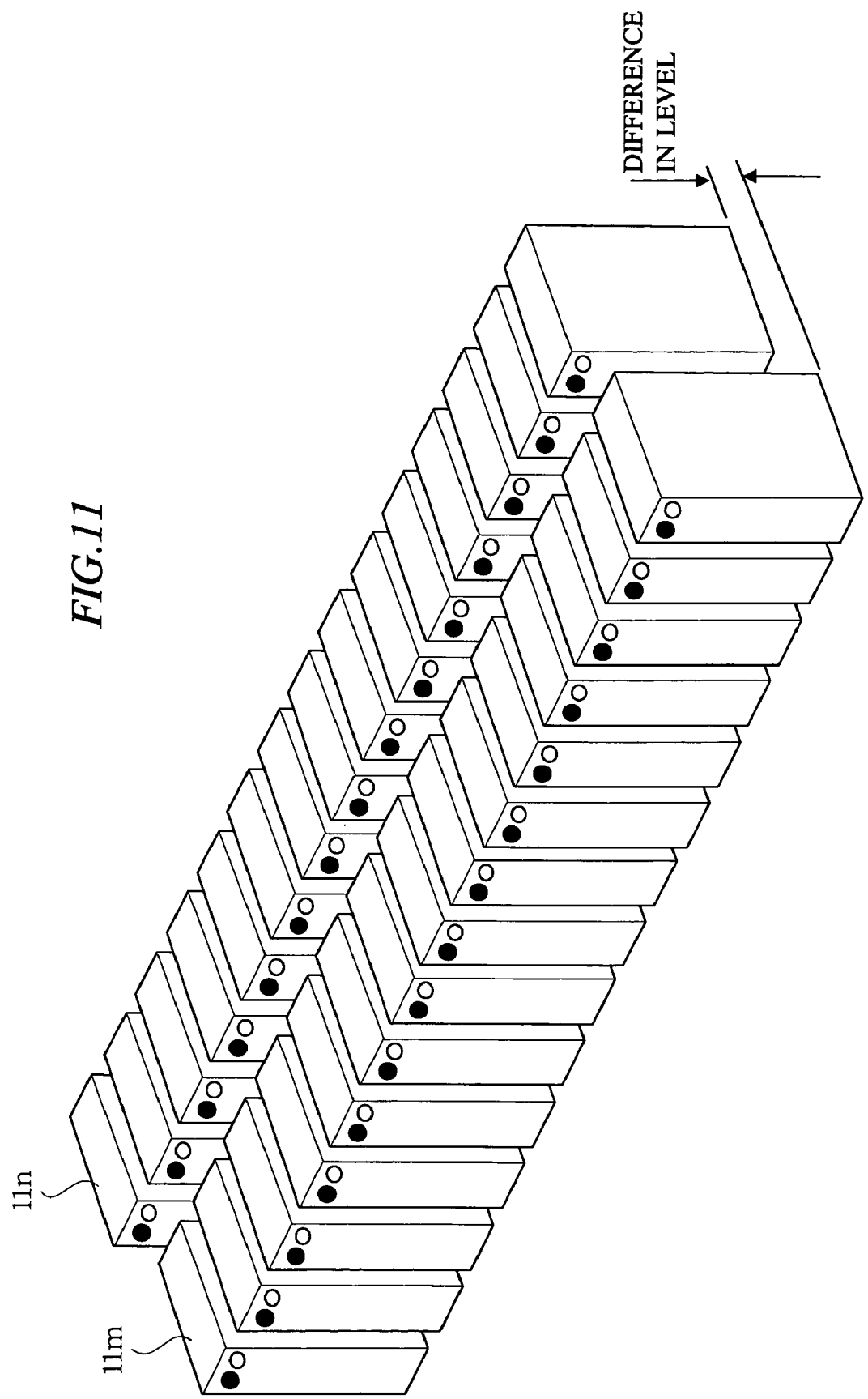
FIG. 11 is a diagram showing the case of another three-dimensional mounting according to an embodiment of the present invention.

An example of the process of mounting canisters will be described with reference to FIGS. 8 to 11. FIG. 8 shows the case of the vertical plane mounting, FIG. 9 shows the case of the horizontal plane mounting, FIG. 10 shows the case of a three-dimensional mounting, and FIG. 11 shows the case of another three-dimensional mounting, respectively.

Usually, in the disk array system, it is necessary to make the temperature increase uniform in the HDDs mounted in the canister and to control the temperature thereof below the reliability assurance temperature. This temperature control can be achieved in the vertical plane mounting but cannot be achieved in the horizontal plane mounting because the temperature increase of the canisters on the upstream side significantly affects the canisters on the downstream side.

For example, in the vertical plane mounting, the operation state of the canisters is clearly checked visually and the control of the temperature increase to the target value can be easily achieved. However, since the canisters are mounted on only one plane, there is the limitation in the mounting density. For example, in the RAID (Redundant Array of Inexpensive Disks) 5, since the data disk and the parity disk are not fixed, the equivalent level is required for the reliability of the canister. Particularly, the assurance temperature of the HDD requires 55° C. or lower in the absolute value in the equivalent level, and the temperature increase must be reduced to 11 to 12° C. or less. If the canisters are mounted in consideration of the flow path under these conditions, the HDD box must have the height of 533.4 mm (12 U) or more.

In this vertical plane mounting, for example, a plurality of canisters 11$f$ are mounted along the height of the wiring board 31$d$ as shown in FIG. 8. The controllers 24 are provided in the backward of the wiring board and the fans 33 are mounted on the rear face. In the case of improving the mounting efficiency of the canisters 11$f$ without changing the volume in this vertical plane mounting method, the front-back mounting can achieve the high mounting efficiency. However, since the canisters need to be mounted on one plane in the rack mount type, the mounting efficiency is deteriorated.

Also, since the operation state of the canisters cannot be checked visually in the horizontal plane mounting, indicator means is necessary. The control of the temperature increase of the canisters to the target value or lower is difficult. However, since it is possible to use the horizontal plane, the high-density mounting can be achieved though there is the limitation in depth.

In the horizontal plane mounting, for example, in the case where the canisters are arranged in two lines as shown in FIG. 9, a plurality of canisters 11$g$ are mounted along the depth direction of the wiring board 31$e$. Furthermore, the controller 24 is provided in the backward of the canisters 11$g$ and the fans 33 are provided on the rear face. In this horizontal plane mounting method, consideration must be given to the flow path regarding the temperature increase, and thus, the mounting density is reduced. Further, in the case where the canisters are arranged in several lines, for example, in four lines, the temperature increases rapidly in the canisters arranged on the downstream side. Therefore, according to a result of the analysis, it is preferable that the canisters are arranged in one line when used as the RAID.

Therefore, in the disk array system according to this embodiment, the advantages of both the vertical plane mounting method and the horizontal plane mounting method are utilized so as to achieve the high-density mounting of the canisters while appropriately controlling the temperature increase. More specifically, in the disk array system according to this embodiment, the indicator of the canister operation state can be checked visually, the temperature increase of the canisters is uniform, and the parity group (for example, 3D+1P or 7D+1P) can be easily constituted. Further, in consideration of the 19 inch rack used actually, it is also preferable to satisfy the conditions that the height of the HDD box is 12 U or less or 10 U or less (15×4=60), and the HDD box has the dimensions capable of being mounted in the 19 inch rack.

Therefore, in the disk array system according to this embodiment, the step (difference in level) is made between the canister 11$h$ and the canister 11$i$, between the canister 11$i$ and the canister 11$j$, and between the canister 11$j$ and the canister 11$k$ as shown in FIG. 10 so as to be able to see the alarm indicator LED 26 and the ready indicator LED 34 of the indicators of the canisters 11$h$, 11$i$, 11$j$, and 11$k$ on both the upstream side and the down stream side in the visual check direction. More specifically, the height of the canister on the downstream side is made higher in comparison to that of the canister on the upstream side so as to make the LED of the canister on the downstream side easy to see. The canisters are arranged in four lines in FIG. 10. However, the number of lines of the canisters to be mounted is determined depending on the size, that is, the depth of the system and the HDD box. Further, in the case where the RAID configuration is 3D+1P or the 7D+1P, the number of the lines is even and determined depending on the mounting efficiency and the temperature increase of the canisters.

Also, in consideration of increase of temperature, if the step is made between the canister on the upstream side and that on the downstream side, the temperature increase becomes uniform. This step is determined depending on the relation between the height of the HDD box and the feed pitch in the depth direction. According to an analysis result, the optimum number of lines is two. Therefore, it is preferable to arrange the canisters in two lines as shown in FIG. 11 when considering the temperature increase. In this case, similar to the above-mentioned case in which the visibility is considered, the canister 11$n$ arranged on the downstream side is shifted from the canister 11$m$ arranged on the upstream side in the height direction. The amount of shift relates to the positions at which the canister on the downstream side is not influenced by the temperature of the canister on the upstream side, and it reduces the difference in temperature increase between the canister on the upstream side and the canister on the downstream side. Therefore, it is possible to contribute to the improvement of the reliability of the disk array system.

(External Appearance and Internal Structure of HDD Box)

Figure 12:
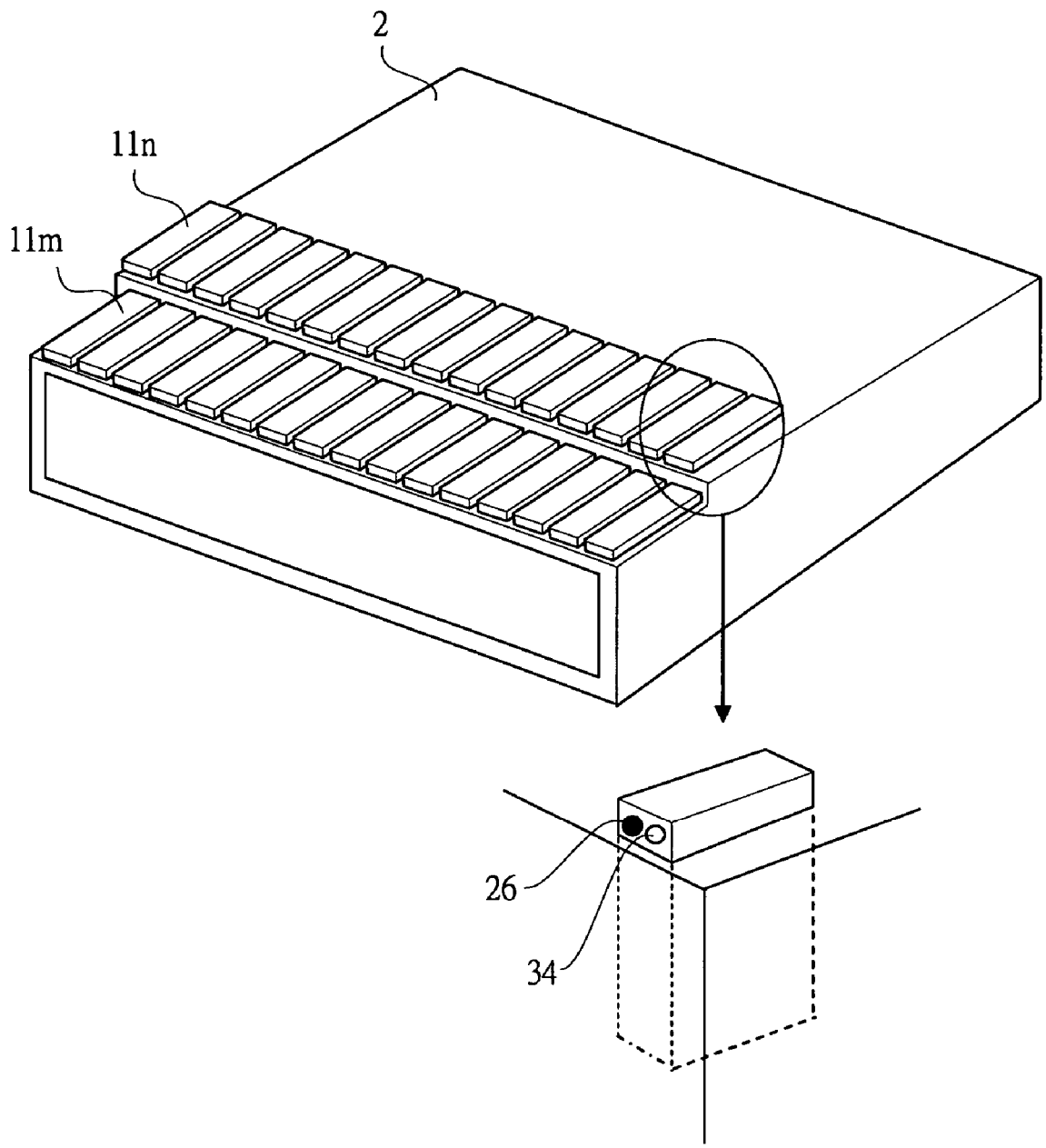
FIG. 12 is a diagram showing an external appearance of the HDD box according to an embodiment of the present invention.
Figure 15:
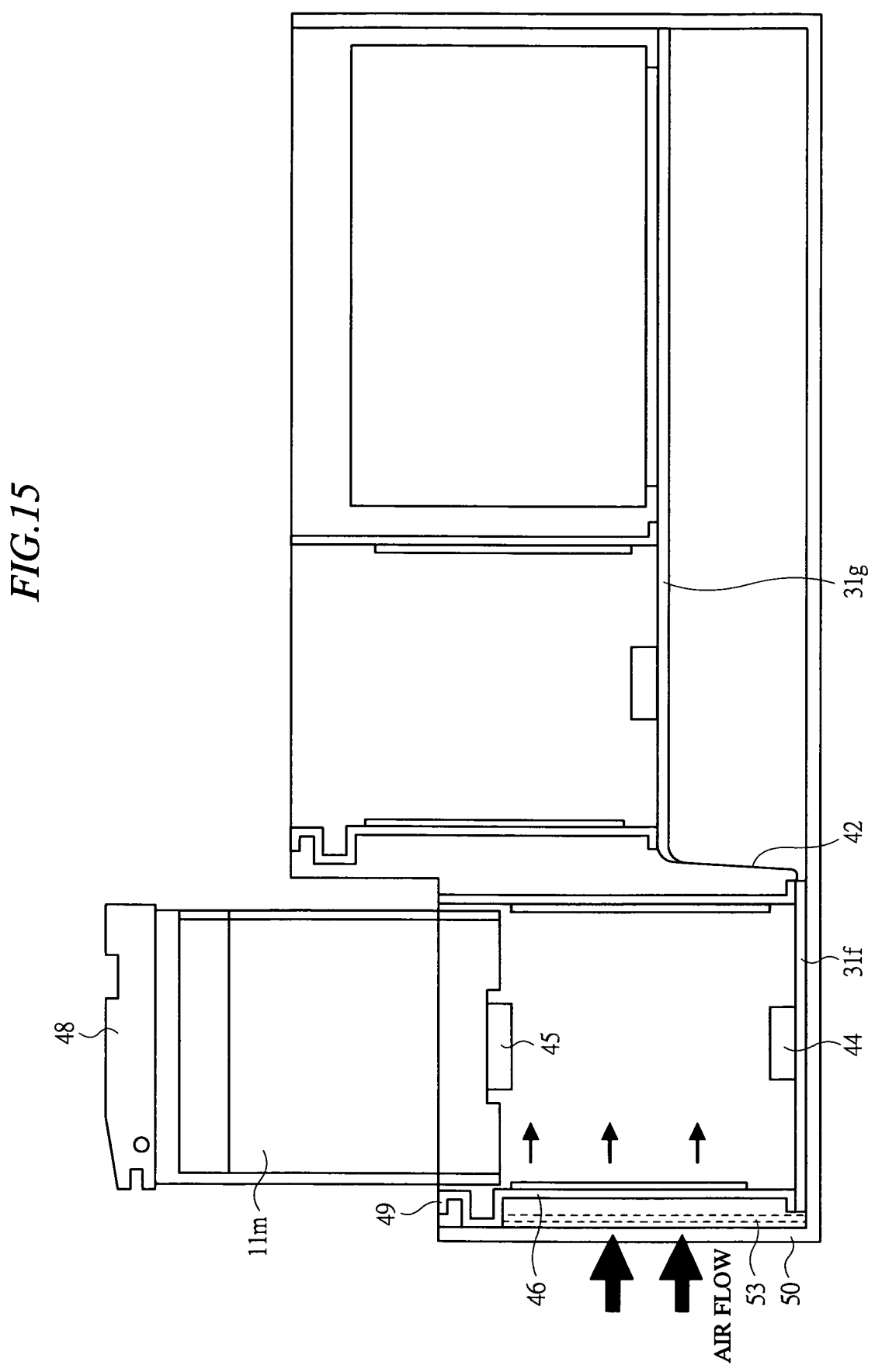

An example of the external appearance and internal structure of the HDD box will be described with reference to FIGS. 12 to 15. FIG. 12 shows an external appearance of the HDD box, FIG. 13 shows an internal structure of the HDD box, FIG. 14 shows a structure of the HDD box, and FIG. 15 shows a positional relationship of inserted canister, respectively.

As described above, in the disk array system according to this embodiment, the advantages of both the vertical plane mounting method and the horizontal plane mounting method are utilized in consideration of the visibility and the temperature increase. Therefore, the HDD box 2 has the external appearance as shown in FIG. 12 (corresponding to the example shown in FIG. 11), in which the step is made between the canisters 11$m$ on the upstream side and the canisters 11$n$ on the downstream side so as to be able to see the alarm indicator LED 26 and the ready indicator LED 34 of the canisters 11$m$ and the canisters 11$n$.

Figure 13:
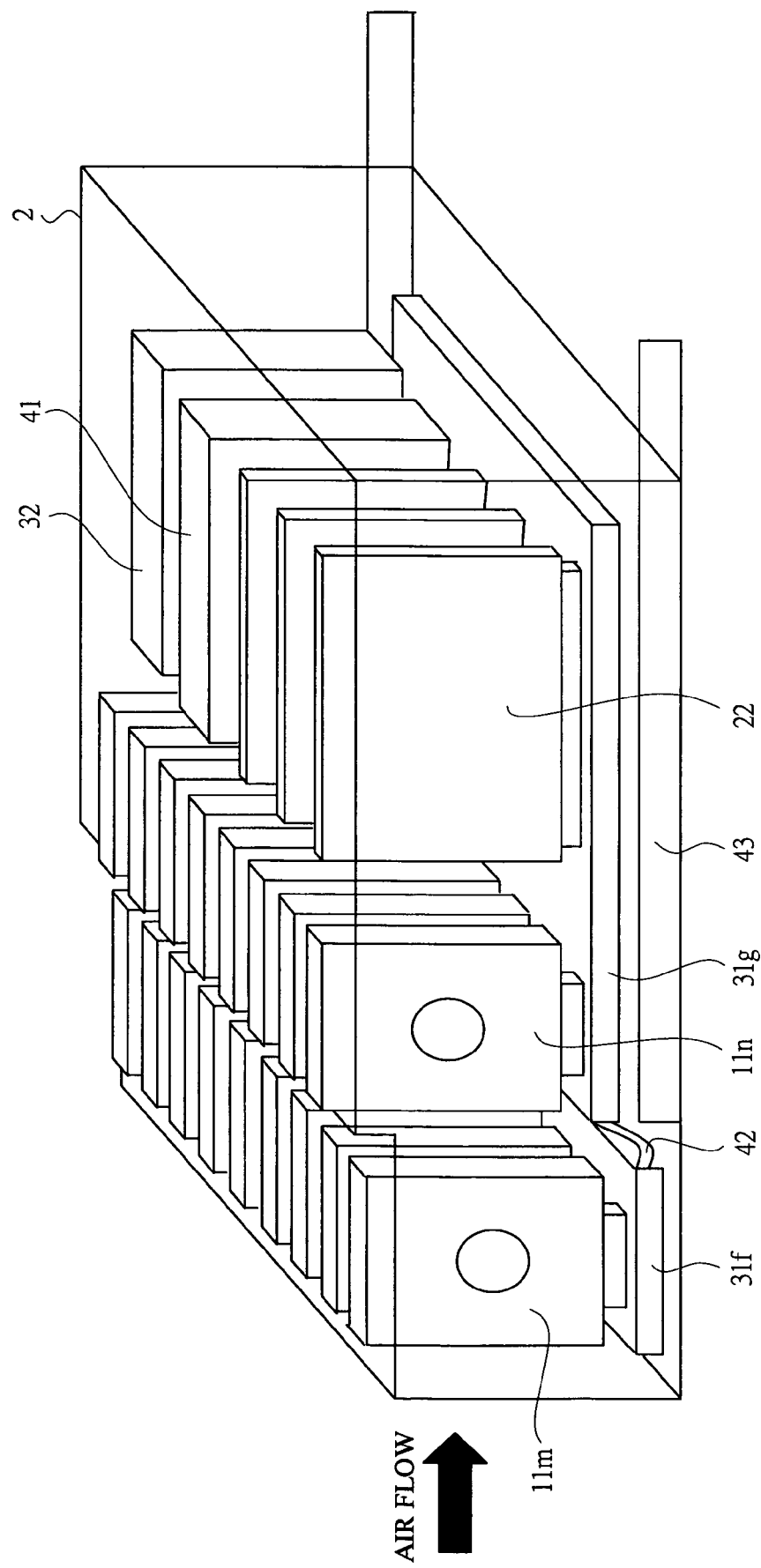
FIG. 13 is a diagram showing an internal structure of the HDD box according to an embodiment of the present invention.
Figure 14:
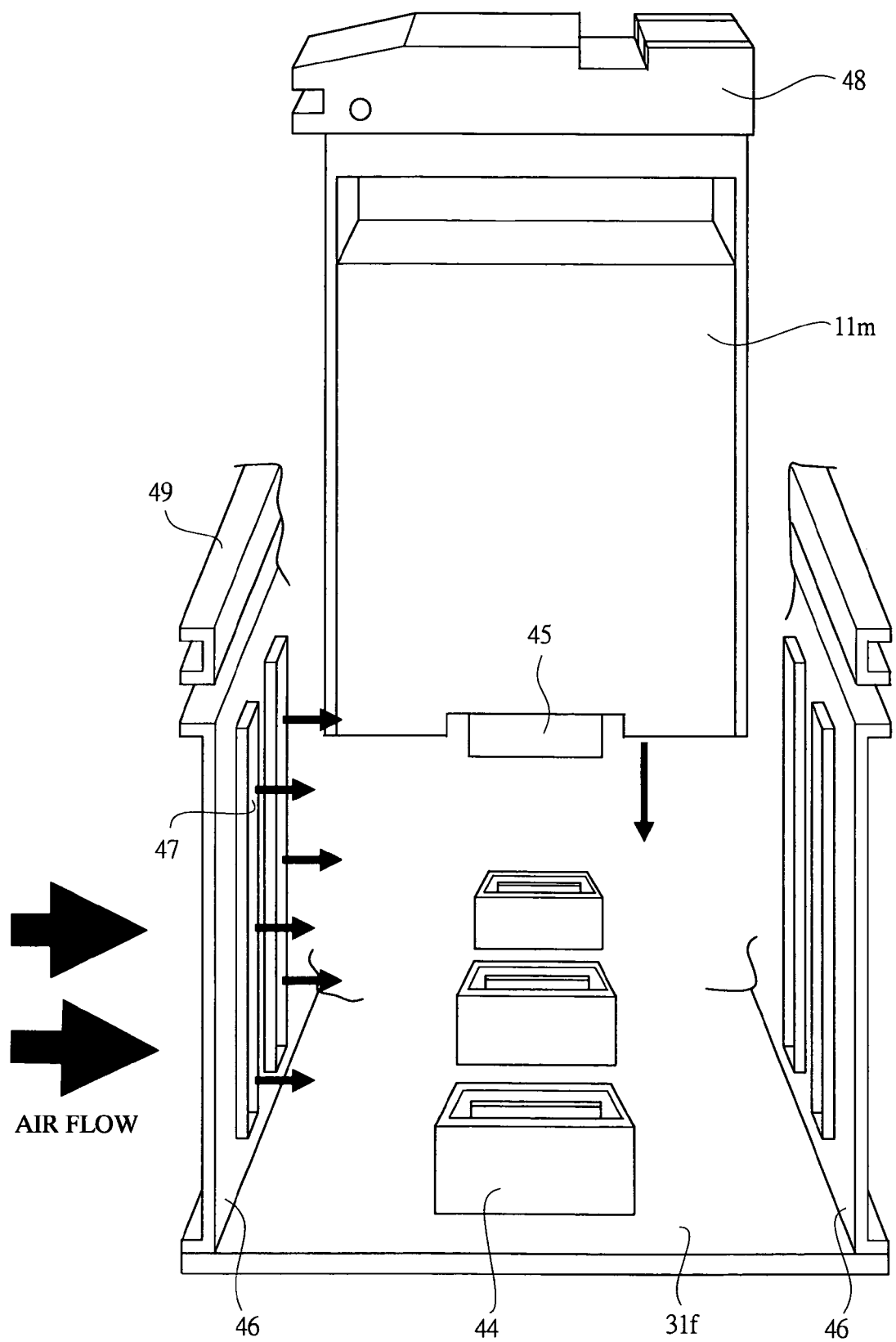
FIG. 14 is a diagram showing a structure of the HDD box according to an embodiment of the present invention.

The internal structure of the HDD box 2 is shown in FIG. 13, in which a plurality of canisters 11$m$ on the upstream side and a plurality of canisters 11$n$ on the downstream side are arranged in this order from the front face of the HDD box 2, and such units as a plurality of fiber switches 22, a battery 41, the AC/DC power sources 32 are arranged in the backward of the canisters. These units are mounted on the two wiring boards 31$f$ and 31$g$, and the plurality of canisters 11$m$ on the upstream side are mounted on one wiring board 31$f$ and the plurality of canisters 11$n$ on the downstream side, the plurality of fiber switches 22, the battery 41, and the AC/DC power sources 32 are mounted on the other wiring board 31$g$. Also, the wiring boards 31$f$ and 31$g$ are electrically connected by a flexible wiring board 42.

Slide rails 43 are attached to the HDD box 2 so that the HDD box can be withdrawn from the chassis frame. For example, when inserting or removing the canisters 11*m* and 11*n*, the HDD box 2 is withdrawn from the chassis frame and the canisters can be inserted or removed.

For example, the positional relationship when inserting the canister 11*m* on the upstream side into the HDD box 2 is as shown in FIG. 14. Connectors 44 are provided on the surface of the wiring board 31*f*. A connector 45 is provided on the bottom surface of the canister 11*m*, and the canister 11*m* is mounted by connecting the connector 45 with the connector 44 on the wiring board 31*f*. The panel 46 is provided on each of the front face side and the rear face side on the wiring board 31*f*, and air holes 47 are opened at the position corresponding to the canister 11*m* mounted on the wiring board 31*f*. This air hole 47 also has a function as a rail when inserting or removing the canister 11*m*. In addition, a canister lever 48 is provided on the upper face of the canister 11*m*, and the canister lever 48 is received by a canister lever receiving metal fittings 49 provided in the upper part of the HDD box 2 when the canister 11*m* is inserted.

FIG. 15 shows the detail of the HDD box 2. A panel 50 having a plurality of holes opened therein is provided on the front face of the HDD box 2, and the mechanism section shown in FIG. 14 into which the canisters 11*m* on the upstream side are inserted is provided inside the panel 50. A front shutter 53 described later is provided between the panel 50 having the holes opened therein and the panel 46 having the air holes 47 of the mechanism section into which the canisters 11*m* on the upstream side are inserted. Further, the mechanism section into which the canisters 11*n* on the downstream side are inserted is provided in the backward of the HDD box 2, and such units as the fiber switch 22, the battery 41, and the AC/DC power source 32 are arranged at the backmost part of the HDD box.

(Electromagnetic Shield Structure of HDD Box)

An example of the electromagnetic shield structure of the HDD box will be described with reference to FIGS. 16 and 17. FIG. 16 shows the electromagnetic shield structure by an upper shutter, and FIG. 17 shows the electromagnetic shield structure by a front shutter, respectively.

In the disk array system according to this embodiment, the electromagnetic shield structure is employed in the upper part and the front part of the HDD box. As shown in FIG. 16, in the electromagnetic shield structure in the upper part of the HDD box, a rotatable upper shutter 52 is provided on each of openings 51 through which each canister 11*o* can be inserted. This upper shutter 52 is closed by the spring force when the canister 11*o* is not inserted. Therefore, the upper shutter 52 functions as the electromagnetic shield cover when it is closed. For example, when the canister 11*o* is inserted into each of the slots based on the RAID configuration, the canisters 11*o* are inserted against the spring force and open the upper shutters 52.

Figure 17:
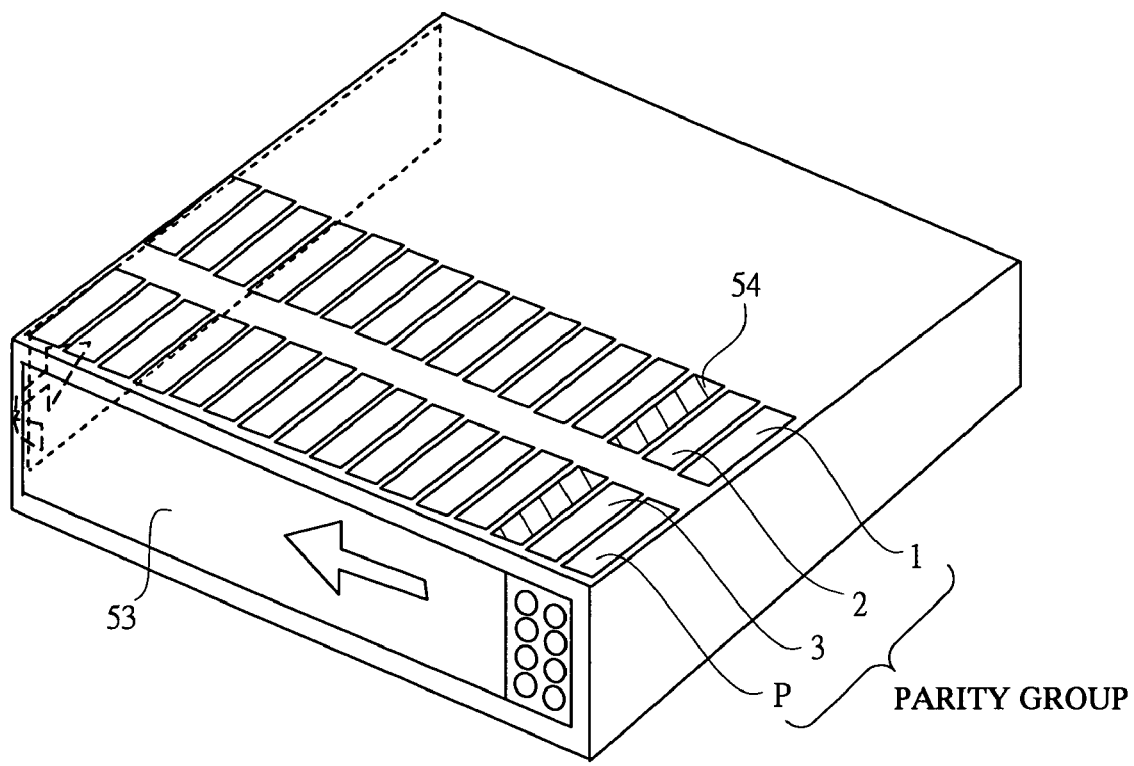
FIG. 17 is a diagram showing the electromagnetic shield structure by a front shutter according to an embodiment of the present invention.

Also, the electromagnetic shield structure on the front side of the HDD box is shown in FIG. 17, in which the front shutter 53 which can be moved from the front part to the side part of the HDD box 2 is provided at the back of the panel 50 having the holes. For example, in the RAID configuration of one parity group, one canister for parity (P) and one canister for data (D3) are inserted on the upstream side and two canisters for data (D1 and D2) are inserted on the downstream side. In this RAID configuration, dummy canisters composed of a box only are inserted into dummy canister insertion slots 54 next to the canister for data (D3) and the canister for data (D2), respectively. Then, the front shutter 53 is moved toward the side position so as to uncover the canisters in the slots and to cover the dummy canisters and the part of the slots into which the canisters are not inserted. By doing so, the closed part of the front shutter 53 has a function as the electromagnetic shield cover. Further, since the dummy canisters are inserted in this structure, the air inflow can be prevented, and the dustproof function can be achieved.

Note that in the case of the RAID configuration of two parity groups (7D+1P), since four canisters are inserted on the upstream side and four canisters are inserted on the downstream side, the front shutter is further moved toward the side position.

(Structure for Preventing Fall of Canister)

Figure 18:
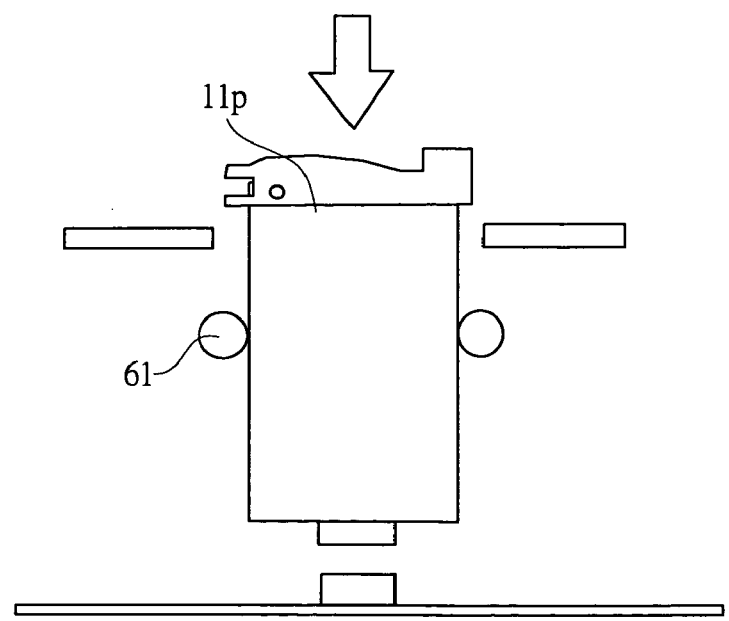
FIG. 18 is a diagram showing the structure for preventing the fall of the canister according to an embodiment of the present invention.

An example of the structure for preventing the fall of the canister will be described with reference to FIG. 18. FIG. 18 shows the structure for preventing the fall of the canister.

Usually, in the disk array system, the canisters are exchanged without powering down the system. At this time, there is the possibility that the canister falls due to gravity and the connector of the canister is damaged. Further, there is the possibility that the wiring board is damaged. This is an important problem.

Therefore, in the disk array system according to this embodiment, rollers 61 which are spaced from each other by a distance equivalent to the depth of the canister 11*p* and can be rotated by the insertion or removal of the canister 11*p* are provided as shown in FIG. 18. For example, when inserting the canister 11*p*, the fall of the canister 11*p* can be prevented because of the friction resistance between the canister 11*p* and the rollers 61. Also, since the rollers 61 are provided, the canister 11*p* can be properly aligned and steadily mounted on the connector on the wiring board. Therefore, the power supply sequence becomes stable even when the canister is inserted without powering down the system.

(Structure of Wiring Board)

Figure 19:
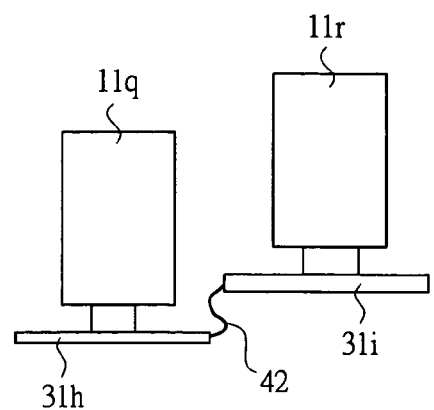
FIG. 19 is a diagram showing the wiring boards with a difference in level therebetween according to an embodiment of the present invention.
Figure 20:
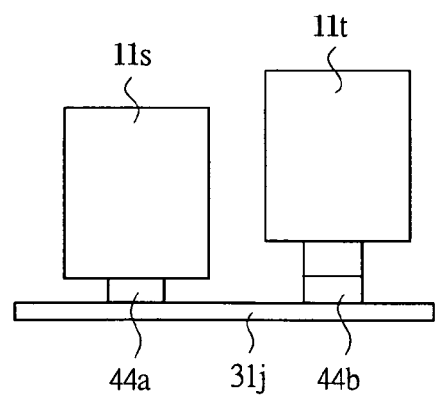
FIG. 20 is a diagram showing the case of using the connectors with different heights according to an embodiment of the present invention.
Figure 21:
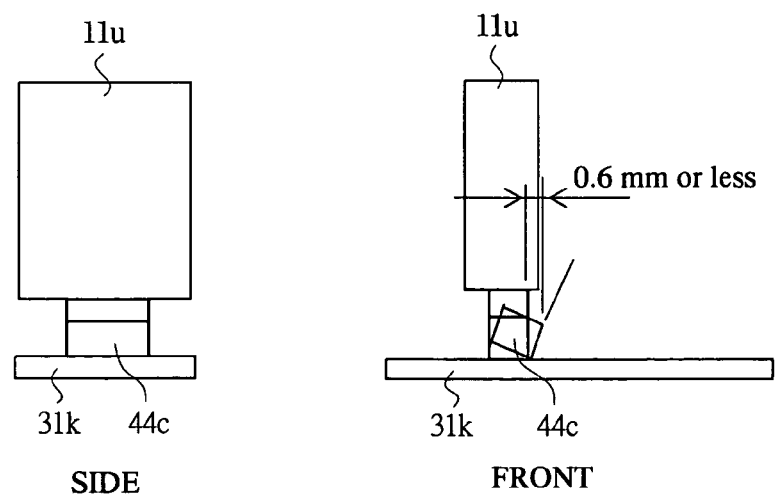
FIG. 21 is a diagram showing the dimensional accuracy of the connectors when mounting a canister according to an embodiment of the present invention.

An example of the structure of the wiring board will be described with reference to FIGS. 19 to 21. FIG. 19 shows the wiring boards with a difference in level therebetween, FIG. 20 shows the wiring board using connectors with different heights, and FIG. 21 shows the dimensional accuracy of the connector when mounting a canister, respectively.

Since the canisters on the upstream side and the canisters on the downstream side are arranged so as to have a difference in level therebetween in the disk array system according to this embodiment, the difference in level is made also in the wiring board on which the connectors are arranged. For example, the wiring board 31*h* on which the canisters 11*q* on the upstream side are mounted and the wiring board 31*i* on which the canisters 11*r* on the downstream side are mounted are arranged with a difference in level therebetween and are electrically connected to each other by the flexible wiring board 42 as shown in FIG. 19. Alternatively, the structure as shown in FIG. 20 is also available. More specifically, in this structure, one wiring board 31*j* and connectors with different heights are used, and the connector 44*a* with a smaller height is used for the canister 11*s* on the upstream side and the connector 44*b* with a larger height is used for the canister 11*t* on the downstream side. By doing so, the difference in level between the canisters can be realized.

Also, the connector on the wiring board must have the dimensional accuracy for properly inserting the canister. More specifically, in order to ensure the alignment accuracy with the canister, the inclination of the connector 44*c* on the wiring board 31*k* with respect to the vertical is desirably 0.6 mm or smaller. Note that it is also possible to employ the floating structure for the connector on the canister 11*u* side and the connector 44c on the wiring board 31k side. However, since the floating structure causes the cost increase, the fixed connectors are used in this embodiment.

(RAID Configuration)

Figure 22:
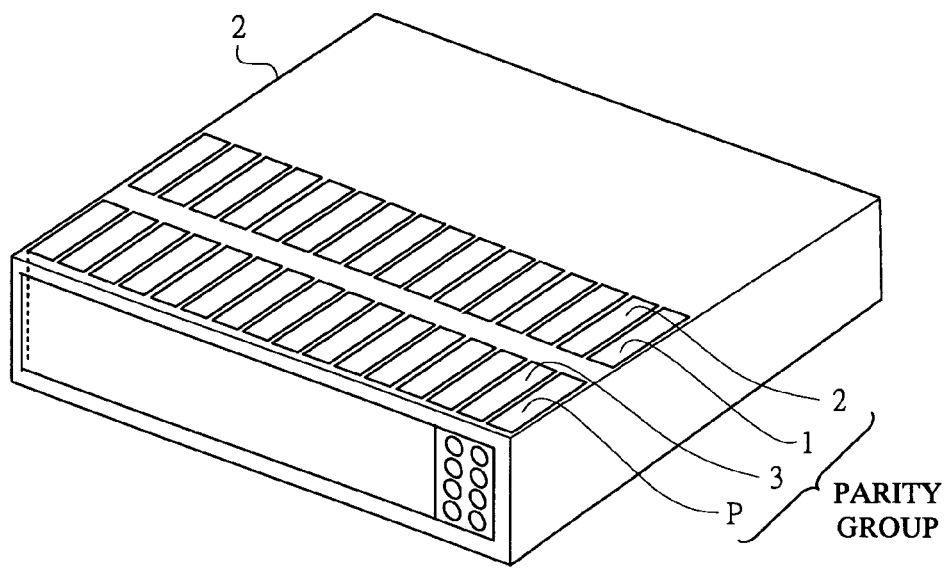
FIG. 22 is a diagram showing the RAID configuration in the case of small capacity.

An example of the RAID configuration will be described with reference to FIGS. 22 and 23. FIG. 22 shows the RAID configuration in the case of small capacity, and FIG. 23 shows the RAID configuration in the case of large capacity, respectively.

For example, in the case of the RAID configuration for small capacity (3D+1P), as shown in FIG. 22, the parity group is composed of one canister for parity (P) and one canister for data (D3) on the upstream side and two canisters for data (D1 and D2) on the downstream side, which are stored in one HDD box 2. Note that, in the case of the RAID configuration (7D+1P), the parity group is composed of one canister for parity (P) and three canisters for data (D5 to D7) on the upstream side and four canisters for data (D1 to D4) on the downstream side.

Figure 23:
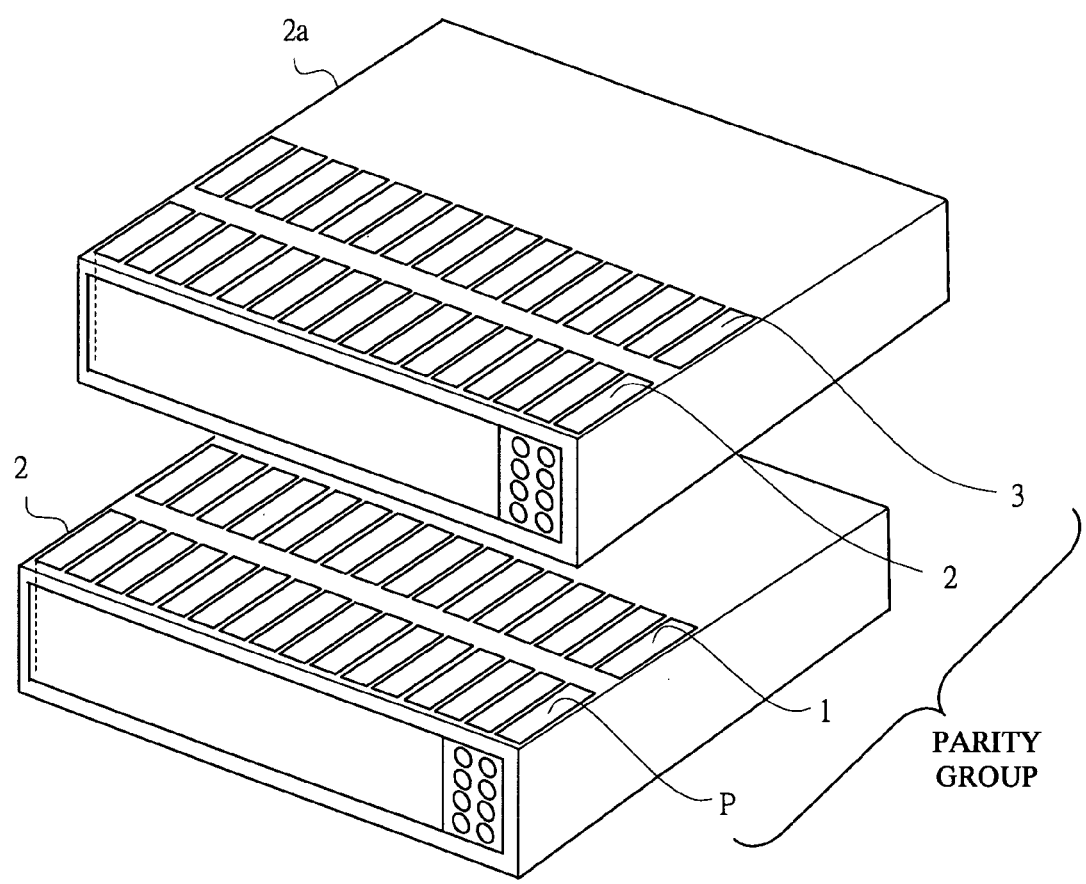
FIG. 23 is a diagram showing the RAID configuration in the case of large capacity.

Also, in the case of the RAID configuration for large capacity (3D+1P), as shown in FIG. 23, two HDD boxes 2 and 2a are used. The parity group is composed of one canister for parity (P) on the upstream side and one canister for data (D1) on the downstream side which are stored in one HDD box 2 and one canister for data (D2) on the upstream side and one canister for data (D3) on the downstream side which are stored in the other HDD box 2a. Note that, in the case of the RAID configuration (7D+1P), the parity group is composed of one canister for parity (P) and one canister for data (D1) on the upstream side and two canisters for data (D2 and D3) on the downstream side which are stored in one HDD box 2 and two canisters for data (D4 and D5) on the upstream side and two canisters for data (D6 and D7) on the downstream side which are stored in the other HDD box 2a. In this configuration using two HDD boxes 2 and 2a, the signal transmission between the HDD boxes can be achieved by the cable connection, and the power source is mounted in each of the HDD boxes.

EFFECT OF EMBODIMENT

As described above, the disk array system according to this embodiment can achieve the effects as follows.

(1) Since the canisters 11m on the upstream side of the cooling air and the canisters 11n on the downstream side thereof are arranged so as to have a difference in level therebetween in the HDD box 2, the three-dimensional mounting which takes into consideration the visibility of the operation state and the temperature increase of each canister can be achieved.

(2) Since the canister 11a (11c) having a lower reliability assurance temperature (small disk size) than the canister 11b (11d) on the downstream side is arranged on the upstream side, the mixed mounting of different types of canisters can be achieved in consideration of the heat generation, and thus, the reliability of the system can be improved.

(3) Since the canisters 11m on the downstream side are arranged at the higher position in comparison to the canisters 11n on the upstream side, the operation state of the canisters on the upstream side and the down stream side can be checked visually from outside.

(4) Since the wiring board 31f on which the canisters 11m on the upstream side are mounted and the wiring board 31g on which the canisters 11n on the downstream side are mounted are arranged so as to have a difference in level therebetween in the HDD box 2, the difference in level between the canisters on the upstream side and the canisters on the downstream side can be realized.

(5) Since the wiring board 31h on which the canisters 11q on the upstream side are mounted and the wiring board 31i on which the canisters 11r on the downstream side are mounted are electrically connected to each other by the flexible wiring board 42, it is possible to supply the voltage to the canisters on the upstream side and the downstream side from the AC/DC power source. Also in this case, one parity group can be composed of the canisters on the upstream side and the canisters on the downstream side.

(6) Since the connector 44a with a smaller height and the connector 44b with a larger height corresponding to the difference in level between the canister 11s on the upstream side and the canister 11t on the downstream side are provided on the wiring board 31j in the HDD box 2, it is possible to achieve the difference in level between the canister on the upstream side and the canister on the downstream side on one wiring board. Also in this case, by making the inclination between the upper part and the lower part of the connector 44c to the wiring board 31k within the range of 0 to 0.6 mm, it is possible to ensure the alignment accuracy between the wiring board and the canister without increasing the cost.

(7) Since the plurality of canisters 11m and 11n on the upstream side and the downstream side are arranged along the width direction thereof in the HDD box 2, it is possible to efficiently cool the canisters without reducing the number of canisters to be mounted, and thus, it is possible to achieve the high-density mounting of the canisters. Also in this case, one parity group can be composed of a plurality of canisters on the upstream side and a plurality of canisters on the downstream side.

(8) Since the two HDD boxes 2 and 2a are used and one parity group can be composed of a plurality of canisters in one HDD box 2 and a plurality of canisters in the other HDD box 2a, it is possible to deal with the RAID configuration for large capacity.

(9) Since the upper shutter 52 which can be opened and closed is provided on the opening through which the canister is inserted and removed in the upper part of the HDD box 2 and the upper shutter is closed when the canister is not inserted, the electromagnetic shield structure can be realized in the HDD box.

(10) Since the front shutter 53 which can move to cover the openings serving as air intake is provided in the front part of the HDD box 2 and the openings corresponding to the positions in which the canisters are not inserted are covered, the electromagnetic shield structure can be realized in the HDD box. Further, by inserting the dummy canisters into the positions in which the canisters are not inserted, the air inflow can be prevented and the dustproof function can be realized.

(11) Since the rollers 61 are provided in the HDD box 2 and the load can be applied by the rollers when inserting or removing the canister, the structure for preventing the fall of the canister can be realized.

In the foregoing, the invention made by the inventors of the present invention has been concretely described based on the embodiments. However, it is needless to say that the present invention is not limited to the foregoing embodiments and various modifications and alterations can be made within the scope of the present invention.

The present invention relates to a mounting technique of a disk array system and is applied to the structure of the HDD box in which a plurality of canisters are stored. More particularly, it relates to a technique effectively applied to a rack mount type disk array system.

What is claimed is:

1. A disk array system, comprising: a storage device for storing data; and a control unit for controlling read and write of the data from and to said storage device, wherein said storage device has a box in which a plurality of memory disk units are stored, a first memory disk unit of said plurality of memory disk units is arranged on a first surface of a bottom of the box while standing upright on an upstream side of cooling air and a second memory disk unit of said plurality of memory disk units is arranged on a second surface of the bottom of the box while standing upright on a downstream side of the cooling air in said box, and said first memory disk unit and said second memory disk unit are arranged so as to have a difference in level there between.

2. The disk array system according to claim 1,
wherein said first memory disk unit has a reliability assurance temperature lower than that of said second memory disk unit.

3. The disk array system according to claim 1,
wherein a disk size of said first memory disk unit is smaller than that of said second memory disk unit.

4. The disk array system according to claim 1,
wherein said second memory disk unit is arranged at a position higher than said first memory disk unit so that an indicator of said second memory disk unit can be checked visually.

5. The disk array system according to claim 1,
wherein a first wiring board on which said first memory disk unit is mounted and a second wiring board on which said second memory disk unit is mounted are provided in said box, and
said first wiring board and said second wiring board are arranged with difference in level corresponding to the difference in level between said first memory disk unit and said second memory disk unit.

6. The disk array system according to claim 5,
wherein said first wiring board and said second wiring board are electrically connected to each other by a flexible wiring board, and
voltage is supplied from a power source to said first memory disk unit through said first wiring board and voltage is supplied from the power source to said second memory disk unit through said second wiring board.

7. The disk array system according to claim 6,
wherein one parity group is comprised of said first memory disk unit and said second memory disk unit.

8. The disk array system according to claim 1,
wherein said box includes a wiring board on which said first memory disk unit and said second memory disk unit are mounted, and
a first connector used to insert or remove said first memory disk unit and a second connector used to insert or remove said second memory disk unit are provided on said wiring board and said first and second connectors have height dimensions corresponding to the difference in level between said first memory disk unit and said second memory disk unit.

9. The disk array system according to claim 8,
wherein inclination between an upper part and a lower part of each of said first connector and said second connector to said wiring board is within a range of 0 to 0.6 mm.

10. The disk array system according to claim 1,
wherein said first memory disk unit is comprised of a plurality of memory disk unites which are arranged along a width direction of said box, and
said second memory disk unit is comprised of a plurality of memory disk units which are arranged along a width direction of said box.

11. The disk array system according to claim 10,
wherein one parity group is comprised of the plurality of memory disk units which constitute said first memory disk unit and the plurality of memory disk units which constitute said second memory disk unit in said box.

12. The disk array system according to claim 1,
wherein another box in which a plurality of memory disk units are stored is provided in addition to said box, and
one parity group is comprised of the plurality of memory disk units in said box and the plurality of memory disk units in said another box.

13. The disk array system according to claim 1,
wherein a plurality of openings through which said plurality of memory disk units can be inserted or removed are formed in an upper part of said box, and
an upper shutter which can be opened and closed is provided on each of said plurality of openings, and said upper shutter is opened when said memory disk unit is inserted and said upper shutter is closed when said memory disk unit is not inserted.

14. The disk array system according to claim 1,
wherein a front shutter which can be moved to cover a plurality of openings for taking said cooling air is provided in a front part of said box, and said front shutter is moved to uncover openings corresponding to positions of the inserted memory disk units and cover openings corresponding to positions where said memory disk units are not inserted.

15. The disk array system according to claim 1,
wherein a plurality of rollers for applying load when said plurality of memory disk units are inserted or removed are provided in said box, and the load is applied by said rollers when inserting or removing said memory disk unit.

* * * * *